(12) United States Patent
Whited

(10) Patent No.: US 8,074,363 B2
(45) Date of Patent: *Dec. 13, 2011

(54) ROTARY KNIFE BLADE FOR LOW FRICTION ROTARY KNIFE

(75) Inventor: Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 1317 days.

This patent is subject to a terminal disclaimer.

(21) Appl. No.: 11/358,176

(22) Filed: Feb. 21, 2006

(65) Prior Publication Data

US 2006/0137193 A1    Jun. 29, 2006

Related U.S. Application Data

(60) Continuation of application No. 10/909,168, filed on Jul. 30, 2004, now Pat. No. 7,000,325, which is a division of application No. 09/120,778, filed on Jul. 22, 1998, now Pat. No. 6,769,184.

(51) Int. Cl.
*A22C 17/00* (2006.01)

(52) U.S. Cl. .......................................... 30/276; 452/133

(58) Field of Classification Search ................... 30/276, 30/347, 329, 337; 83/665, 666, 676; 452/132, 452/133, 137, 149

See application file for complete search history.

(56) References Cited

U.S. PATENT DOCUMENTS

| 1,220,345 | A | * | 3/1917 | Koster | ........................... 384/571 |
| 1,374,988 | A | | 4/1921 | Cooper | |
| 1,476,345 | A | | 9/1922 | McGee | |
| 2,266,888 | A | * | 12/1941 | McCurdy et al. | ............. 384/550 |
| 2,827,657 | A | | 4/1954 | Bettcher | |

(Continued)

FOREIGN PATENT DOCUMENTS

FR    1 216 947    4/1960

OTHER PUBLICATIONS

Oct. 3, 2011 Decision and Opinion of the United States Court of Appeals for the Federal Circuit (Appeal No. 2011-1038,-1046) regarding the case styled *Bettcher Industries, Inc.* v. *Bunzl USA, Inc. and Bunzl Processor Distribution, LLC* Case No. 3:08 CV 2423, U.S. District Court for the Northern District of Ohio, Judge Zouhary. The Decision and Opinion relates to U.S. Pat. No. 7,000,325, which issued from U.S. Appl. No. 10/909,168, the parent of the present application (47 pages).

(Continued)

*Primary Examiner* — Stephen Choi

(74) *Attorney, Agent, or Firm* — Tarolli, Sundheim, Covell & Tummino LLP

(57) ABSTRACT

A power operated knife comprises a blade supporting structure supporting an annular blade for rotation about a central axis. The blade and blade supporting structure are engagable along bearing contact locations that are spaced apart in a direction parallel to the axis so that the blade is stabilized both radially and axially as the knife operates. The blade supporting structure comprises a split blade housing member that is radially expandible and contractible to receive the blade. The split blade housing member and blade engage along relatively short lines of bearing contact that serve to minimize friction and blade heating when the knife operates. The bearing locations are spaced apart both circumferentially around the blade perimeter and in the direction of the axis so that the blade position is stabilized during operation of the knife.

10 Claims, 5 Drawing Sheets

U.S. PATENT DOCUMENTS

| | | |
|---|---|---|
| RE25,947 E | 12/1965 | Bettcher |
| 3,269,010 A | 8/1966 | Bettcher |
| 4,082,232 A | 4/1978 | Brewer |
| 4,170,063 A | 10/1979 | Bettcher |
| 4,178,683 A | 12/1979 | Bettcher |
| 4,198,750 A | 4/1980 | Bettcher |
| 4,236,531 A | 12/1980 | McCullough |
| 4,267,759 A | 5/1981 | Sullivan et al. |
| 4,326,361 A | 4/1982 | McGill |
| 4,363,170 A | 12/1982 | McCullough |
| 4,439,924 A | 4/1984 | Bettcher |
| 4,494,311 A | 1/1985 | McCullough |
| 4,509,261 A | 4/1985 | Bettcher |
| 4,516,323 A | 5/1985 | Bettcher |
| 4,575,938 A | 3/1986 | McCullough |
| 4,609,227 A | 9/1986 | Wild et al. |
| 4,637,140 A | 1/1987 | Bettcher |
| 4,829,860 A | 5/1989 | VanderPol |
| 4,854,046 A | 8/1989 | Decker et al. |
| 4,909,640 A | 3/1990 | Nakanishi |
| 5,099,721 A | 3/1992 | Decker et al. |
| 5,331,877 A | 7/1994 | Ishii |
| 5,419,619 A | 5/1995 | Lew |
| 5,522,142 A | 6/1996 | Whited |
| 5,529,532 A | 6/1996 | Desrosiers |
| 5,664,332 A | 9/1997 | Whited et al. |
| 5,692,307 A | 12/1997 | Whited et al. |
| 5,761,817 A | 6/1998 | Whited et al. |
| 5,971,413 A | 10/1999 | El-Kassouf |

OTHER PUBLICATIONS

Jul. 28, 2011 Decision on Appeal of the Board of Patent Appeals and Interferences (Appeal No. 20011-00791, Control No. 95/001,130) regarding the inter partes reexamination of U.S. Pat. No. 7,000,325, which issued from U.S. Appl. No. 10/909,168, the parent of the present application (12 pages).

\* cited by examiner

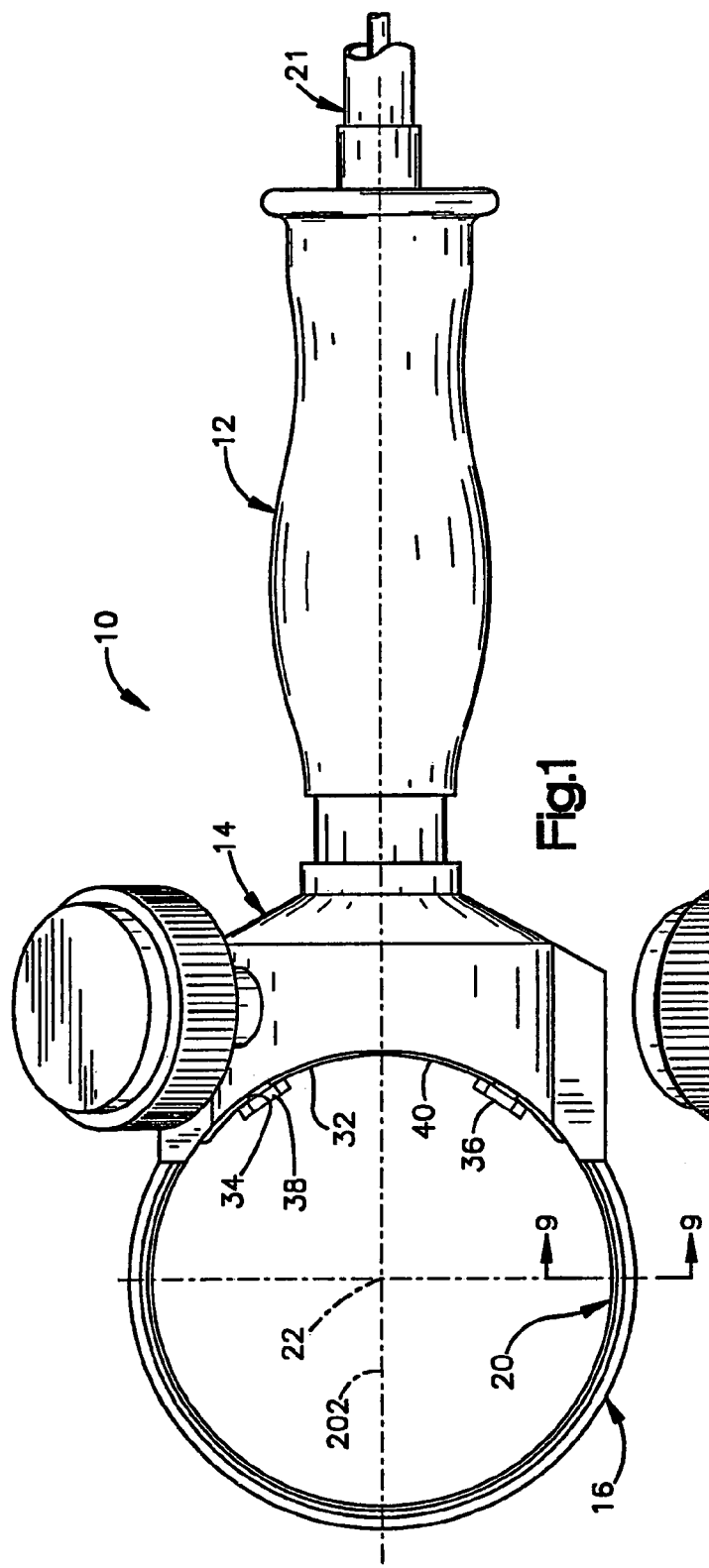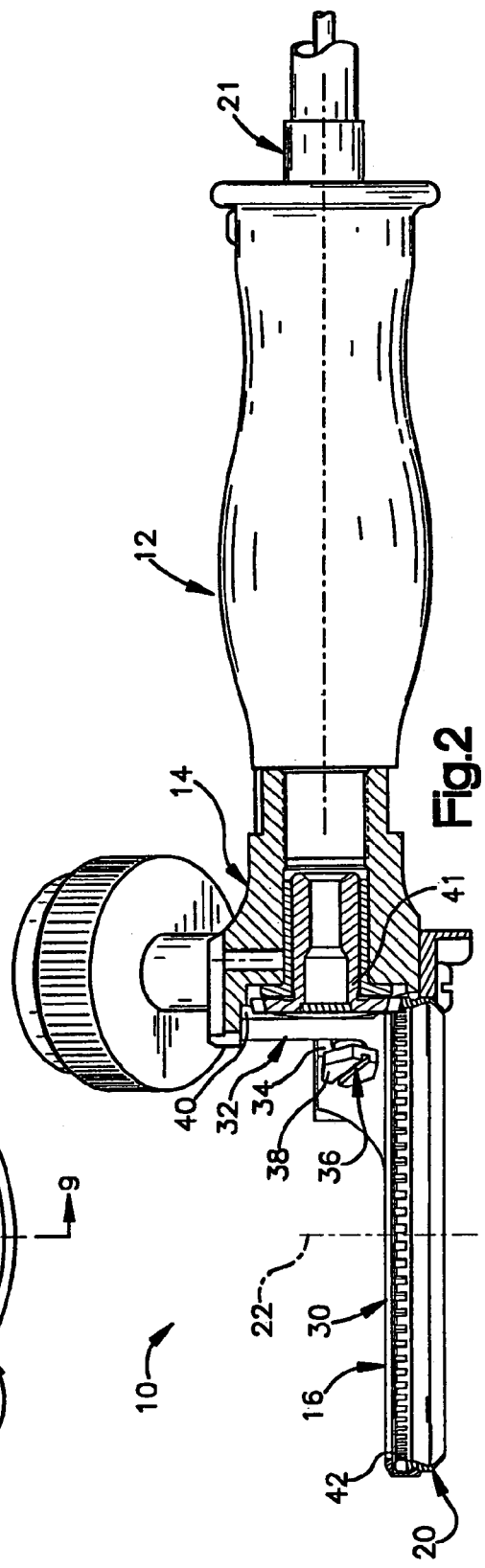

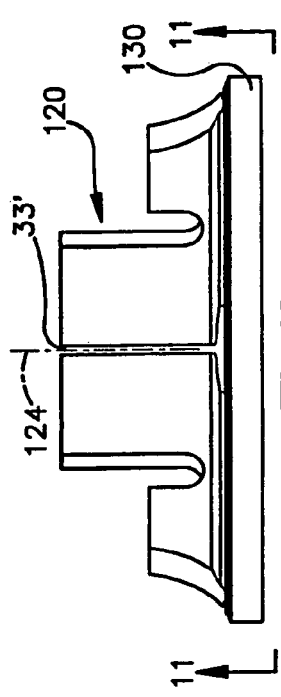
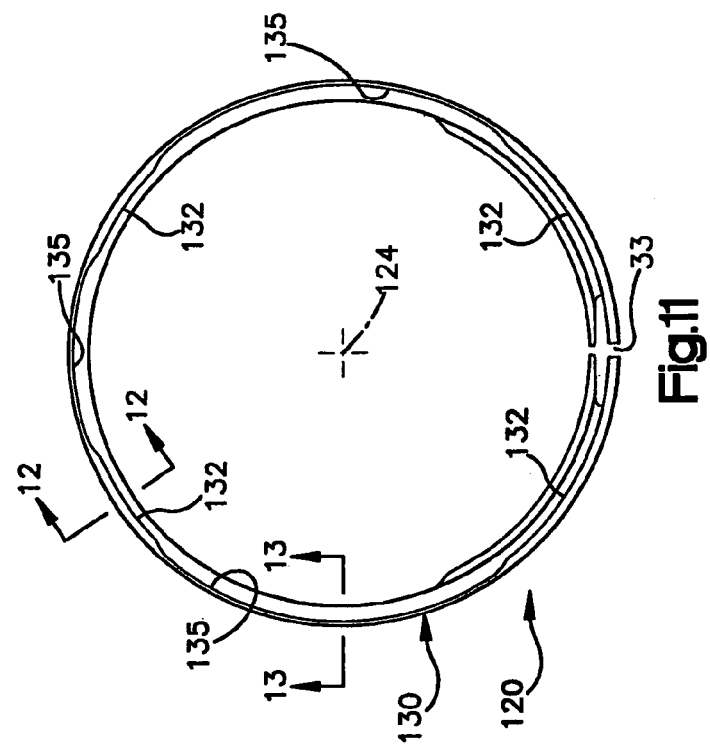
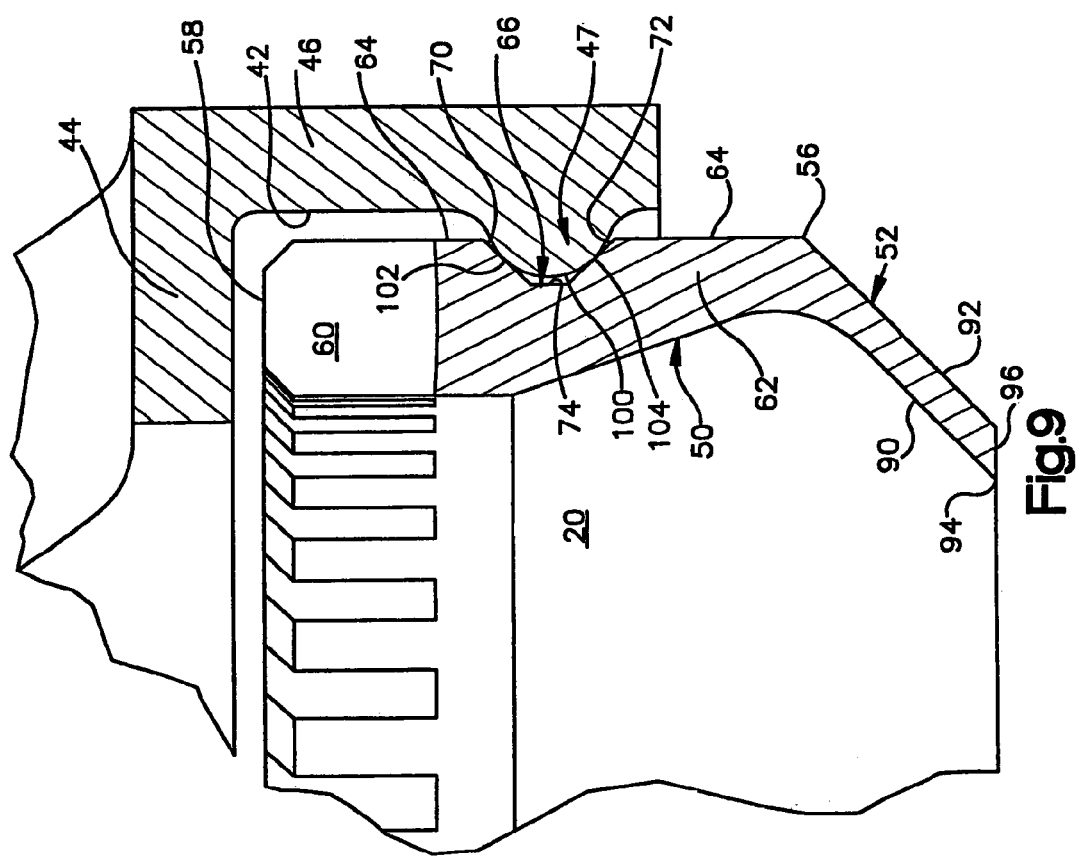

ROTARY KNIFE BLADE FOR LOW FRICTION ROTARY KNIFE

CROSS-REFERENCE TO RELATED APPLICATIONS

This application is a continuation of U.S. application Ser. No. 10/909,168, filed on Jul. 30, 2004, which will issue as U.S. Pat. No. 7,000,325 on Feb. 21, 2006, which is a divisional of U.S. application Ser. No. 09/120,778, filed Jul. 22, 1998, now issued as U.S. Pat. No. 6,769,184 on Aug. 3, 2004. U.S. application Ser. Nos. 10/909,168 and 09/120,778 are incorporated herein in their respective entireties by reference.

FIELD OF THE INVENTION

The present invention relates to power operated rotary knives and more particularly to a power operated rotary knife wherein a rotatable annular blade is supported for rotation about a central axis by a blade support structure providing bearing contact that minimizes blade vibration and heating.

BACKGROUND OF THE INVENTION

Power operated rotary knives have been in wide-spread use in meat packing and other commercial food processing facilities. These knives usually comprised a handle and a blade housing that supported an annular knife blade. The knife blade was driven about its central axis relative to the blade housing by a motor via a gear train.

The knife blade comprised an annular body, a blade section projecting axially from the body and driving gear teeth projecting axially from the body oppositely from the blade section. The blade housing maintained the blade in position relative to the knife as the blade rotated. The blade was subjected to various forces created by both the drive transmission and the cutting action of the knife.

In some knives the blade housing defined a blade supporting race in the form of a peripheral groove that was rectilinear in cross sectional shape for receiving the blade body and gear teeth. These blade housings were frequently split and were resiliently expandable to receive the blade. The blade body and gear teeth were shaped to confront the axially opposite blade race sides with running clearance just sufficient to prevent the blade from binding in the groove. Consequently the blade and blade housing were slidably engaged, over relatively wide contact areas.

In some other knives the blade housings had a radially inwardly extending lip that defined a frustoconical surface engaging a frustoconical blade surface to prevent the blade from separating axially from the blade housing. In such cases, the knives also comprised a shoe that pivoted into engagement with the blade. The shoes also provided frustoconical surfaces that wedged the blade toward the blade housing and retained the blade in place.

Some prior art rotary knives tended to vibrate undesirably in use because the blade rotation axis was permitted to shift relative to the blade housing. Put another way, the blade tended to bounce around within the blade housing so that the entire knife vibrated. In the knives where the blade was secured to the knife by confronting wedging surfaces, the blade vibration caused the blade to shift axially into undesired contact with the blade housing. This axial blade movement contributed both to knife vibration and blade heating. In order to constrain the blade to rotate about an axis that was relatively fixed with respect to the blade housing, the blade housing diameter was adjusted to minimize the radial clearance between the radially outer blade body and gear surfaces and the radially outer race surface. This reduced vibration.

Although vibration was reduced, other problems were created. First, where the blade housing was adjusted to provide a tight running clearance, heat generated by frictional contact between the blade and blade support was often sufficient to begin to cook the product being trimmed. The heated product created a sticky build-up on the knife parts that generated even more friction heat. In some circumstances, when the housing diameter was adjusted, the race became slightly-out of round, or out of plane. This condition tended to contribute to both vibration and overheating.

The usual approach to ameliorating these problems was to assemble the blade and housing with running clearances that were tight enough to keep vibration at tolerable levels yet open enough to avoid overheating. Another practice used to reduce vibration and heating was to operate the knife at relatively low rotational speeds. User effort required to operate the knife increased with lowered operating speeds because the slicing action was reduced. Despite these efforts, the prior art knives tended to both vibrate and run hot. Where operated at low speeds, the vibration and friction heating were accompanied by increased user effort.

The present invention provides a new and improved annular blade for a rotary knife wherein the blade is supported for rotation about a central axis at a plurality of line contact bearing locations, resulting in a knife that exhibits minimal vibration and heating and may be operated at relatively high speeds so that user effort is reduced.

SUMMARY OF THE INVENTION

According to a preferred embodiment of the invention the power operated knife comprises a blade supporting structure supporting an annular blade for rotation about a central blade axis. The blade and blade supporting structure are engagable along bearing contact locations that are spaced apart in a direction parallel to the axis so that the blade is stabilized both radially and axially as the knife operates.

The rotary knife blade comprises an annular body disposed about the central axis and an annular blade section projecting from the body. The body defines blade bearing surfaces that converge proceeding toward each other.

In the preferred knife the blade supporting structure comprises a split blade housing member that is radially expandable and contractible to receive the blade. The housing member is provided with bead sections that are spaced circumferentially apart about the blade periphery, project into a bearing race formed in the blade, and engage the blade bearing faces as the knife operates. The split blade housing member is adjusted so the blade and housing engage along relatively short lines of-bearing contact that serve to minimize blade-housing friction—and consequential blade and housing heating—when the knife operates. The spaced bead sections stabilize the blade as it rotates by providing a series of bearing locations that are spaced apart both circumferentially around the blade perimeter and in the direction of the axis. The blade rotation axis is thus maintained substantially stationary relative to the knife so that knife operation is virtually vibration free. Because the blade is suspended by the bearing locations, the blade and housing remain spaced apart except at the bearing locations even if the blade housing suffers from out-of-round and/or out-of-plane distortions.

Other features and advantages of the invention will become apparent from the following description of a preferred.

embodiment made in reference to the accompanying drawings, which form a part of the specification.

BRIEF DESCRIPTION OF THE DRAWINGS

FIG. 1 is a top plan view of a power operated knife incorporating a blade constructed according to the invention;

FIG. 2 is an elevational view of the knife of FIG. 1 with portions illustrated in cross-section;

FIG. 9 is an enlarged fragmentary cross sectional view of part of the knife shown in FIG. 1, seen approximately from the plane indicated by the line 9-9 of FIG. 1;

FIG. 10 is a view similar to FIG. 5, showing a modified knife embodying the invention;

FIG. 11 is an enlarged cross sectional view of part of the blade support structure of FIG. 10 seen approximately from the plane indicated by the line 11-11;

DESCRIPTION OF THE BEST MODES CONTEMPLATED FOR PRACTICING THE INVENTIONS

Figure 3:
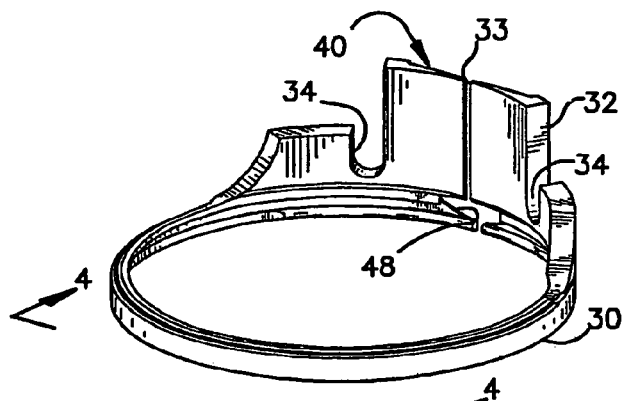
FIG. 3 is a perspective view of a blade support structure forming part of the knife of FIGS. 1 and 2.

A power operated knife 10 constructed according to a preferred embodiment of the invention is illustrated by FIGS. 1 and 2 of the drawings as comprising a handle 112, a headpiece 14, a blade support structure 16 and an annular blade 20.

The knife 10 is connected to a remote electric motor via a flex shaft 21 that extends into the handle 12 and transmits drive from the motor to the blade 20. The motor and flex shaft may be of any conventional or suitable construction and are not illustrated or described in detail. The flex shaft is sufficiently supple that the user of the knife, grasping the handle, moves the knife with ease and accuracy while slicing or trimming meat, or removing meat from bones, etc. The handle 12 and headpiece 14 may be of any conventional or suitable construction and are therefore not described in detail. Although an electric motor driven knife is disclosed, the knife could as well contain a pneumatic motor in the handle 12 and be connected to a compressed air supply by a suitable hose.

The blade support structure 16 supports the blade 20 for rotation about its central axis 22 with the blade and blade support structure engagable at least at bearing locations that are spaced axially apart (i.e. spaced apart proceeding in the direction of the axis 22. In a preferred embodiment the bearing locations are defined by circumferential line segments. The bearing line segments assure that the blade and blade support structure engage only along extremely small contact areas. The axially spaced apart bearing line segments assure that the blade is positively supported against lateral and axial vibrations relative to the blade support structure while frictional resistance to blade rotation afforded by the bearing contact is minimized thus minimizing heat build-up in the knife. As best illustrated-by FIG. 9, the axially spaced bearing locations suspend the blade so that the blade and blade support structure remain spaced apart except for the bearing locations.

Figure 4:
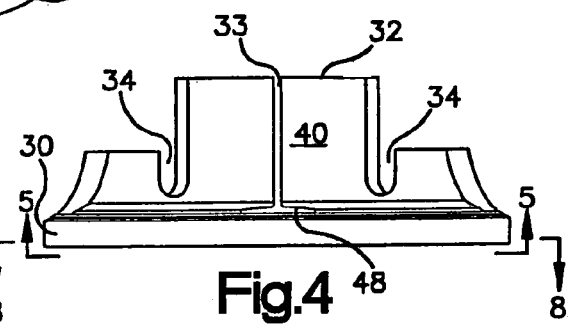
FIG. 4 is an elevational view seen approximately from the plane indicated by the line 4-4 of FIG. 3.
Figure 5:
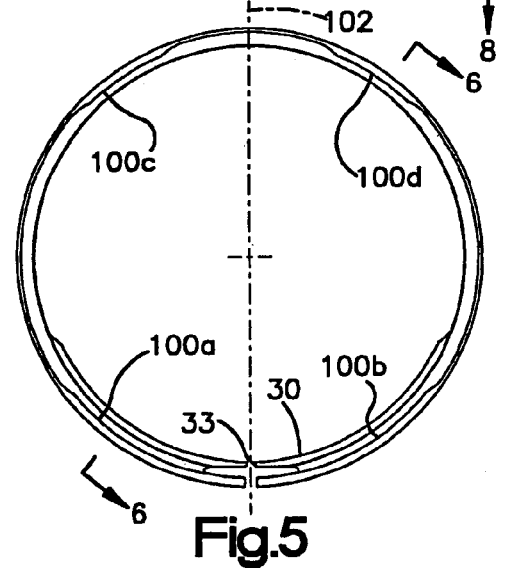
FIG. 5 is a-view seen approximately from the plane indicated by the line 5-5 of FIG. 4.

The illustrated blade support structure 16 forms a split ring-like structure that comprises an annularly curved body section 30 extending about the blade 20 and an axially extending mounting section 32 for securing the blade support structure 16 to the headpiece. See FIGS. 2-4. The body section 30 extends substantially completely about the blade with the split 33 centered with respect to the headpiece. The mounting-section 32 extends axially from the body section 30 and detachably connects the body section to the headpiece.

The mounting section 32 is illustrated as a circularly curved wall like structure that confronts the headpiece with the split 33 extending centrally through it. The mounting section 32 defines open ended mounting slots 34 on opposite sides of the split 33 that receive-mounting screws 36 (FIG. 2) for securing the blade support structure in place on the headpiece. The slots 34 are significantly wider than the screw thread diameters. The mounting screw heads 38 are substantially wider than the slots. The screw heads engage the mounting section 32 on both sides of the associated mounting slots 34 to securely clamp the blade support structure in place against the headpiece when the screws are tightened down. The mounting section central portion 40 essentially covers the adjacent headpiece face and, as such, covers a blade driving pinion gear 41 (FIG. 2) that is mounted in the headpiece and driven from the flex shaft 21. The central portion face that confronts the headpiece is machined to provide a planar face confronting the pinion gear 41 so the central portion wall thickness gradually diminishes proceeding toward the split 33 (see FIG. 3). The curved headpiece face and the confronting curved mounting section faces on opposite sides of the central portion 40 define mating grooves and lands that extend circumferentially relative to the blade support structure to assure that the blade support structure is securely aligned with and supported by the headpiece.

Figure 6:
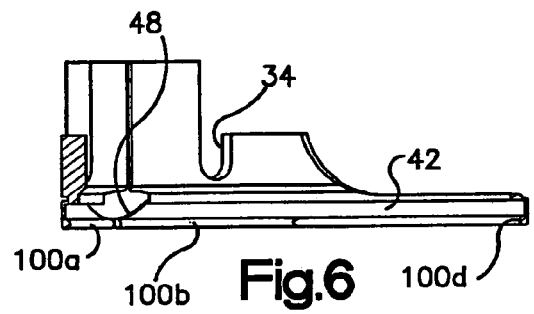
FIG. 6 is a cross sectional view seen approximately from the plane indicated by the line 6-6 of FIG. 5.
Figure 7:
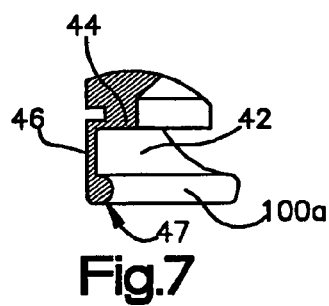
FIG. 7 is an enlarged fragmentary-view of part of the blade support structure of FIG. 6.
Figure 8:
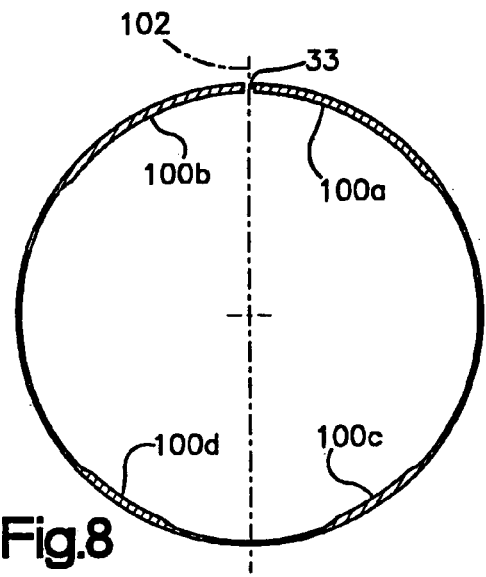
FIG. 8 is a cross sectional view seen approximately from the plane indicated by the line 8-8 of FIG. 4.
Figure 12:
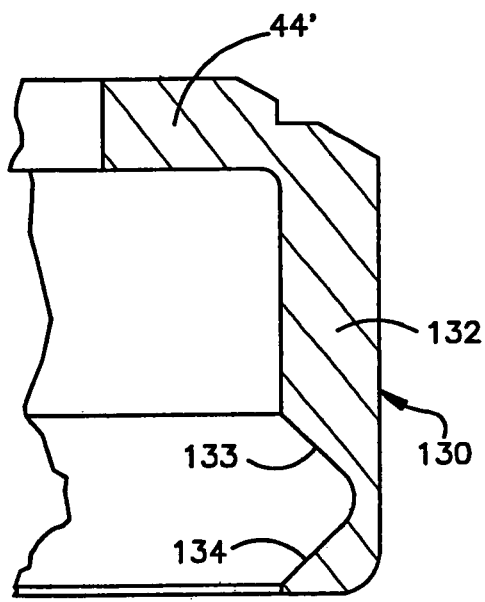
FIG. 12 is an enlarged cross sectional view of part of the blade support structure of FIG. 10 seen approximately from the plane indicated by the line 12-12.

The body section 30 retains the blade assembled to the knife while supporting the blade for stable, low friction, high speed rotation despite the application of various forces encountered during knife operation. The body section 30 defines a circumferentially extending groove, or groove like space, 42 that receives the blade 20 when the blade is assembled to the knife (see FIGS. 7 and 9). The groove is formed in part by a radial body section wall 44 disposed in a plane that extends normal to the blade axis 22, an outer peripheral wall 46 that extends about the blade periphery, and a blade retaining bearing structure 47 that extends radially inwardly from the wall 46 for engagement with the blade 20. The walls 44 and 46 are cut away on either side of the split 33 to provide a semicircular clearance space 48 (FIGS. 3, 4 and 6) for the pinion gear 41.

The blade 20 comprises an annular body 50 disposed about the central axis 22 and an annular blade section 52. In the illustrated embodiment of the invention (FIG. 9) the body 50 defines first and second axial ends 56, 58. The blade section 52 projects axially from the first axial end 56, The body 50 is comprised of gear teeth 60 forming the second axial body end 58 remote from the blade section 52, a wall 62 defining a radially outer surface 64 disposed between the body ends 56, 58, and an annular bearing race, or groove, 66 opening in the surface 64. The illustrated gear teeth 60. are cut through the wall 62 to form a ring gear extending about the body end 58. The gear teeth 60 are disposed in the blade support groove 42 adjacent its walls 44, 46 so the pinion gear and the ring gear mesh in the clearance space 48. The ring gear runs in mesh with the driving pinion gear 41 when the knife 10 operates.

The bearing race 66 receives the bearing structure 47 so that the blade body 50 is secured to the blade support structure by the bearing race and bearing structure engagement along bearing locations that are spaced axially apart and firmly support the blade against axial and radial shifting during use. The bearing race 66 extends into the wall 62 and is spaced axially from the blade section 52 in that the surface 64 extends between the bearing structure 47 and the blade section 52.

The bearing race 66 comprises a first and second bearing surfaces 70, 72 that converge proceeding toward each other. In the illustrated knife the race extends radially inwardly into the wall 62. The bearing surface 70 converges proceeding away from the second axial end 58, and the second bearing surface 72. converges proceeding toward the first bearing surface 70. In the illustrated blade, the surfaces 70, 72 are frustoconical. As shown, they are joined at their radially inner ends by a short axially extending annular surface 74 that serves to minimize the-race depth and does not engage the bearing structure 47.

The blade section 52 is of conventional or suitable construction and, as illustrated, is formed by radially, inner and outer surfaces 90, 92 that converge toward each other proceeding away from the body 50 toward a cutting edge 94 at the projecting blade end. In the illustrated knife the edge 94 is formed by the juncture of the surface 90 and a surface 96 that extends between the surfaces 90, 92. The surfaces 90, 92 are illustrated as continuous with the blade body 50 and since the surfaces 90, 92 converge, the wall thickness of the blade section is less than that of the body 50. Although a particular blade configuration is disclosed, various annular blade configurations are commonly used in power operated knives depending on the particular use to which the knife is put. Any such blade configuration may be used with a knife embodying the invention.

In the preferred and illustrated embodiment of the invention the blade and blade support structure engage along lines of bearing contact at a first plurality of circumferentially spaced apart bearing locations disposed in a plane that is transverse to the axis 22, and at a second plurality of circumferentially spaced apart bearing locations disposed in a second plane that is spaced from the first plane and extends transverse to the axis 22. In the illustrated knife 10 the bearing structure 47 is formed by at least three radially inwardly projecting beads 100 that are spaced circumferentially apart about the blade support structure. See FIGS. 5, and 7-9. Each illustrated bead has a semicircular cross sectional shape (see FIG. 9) so that each bead firmly engages the frustoconical surfaces 70, 72 along the respective arcuate bearing contact line segments 102, 104. (FIG. 9). In the illustrated knife, four beads 100a, 100b, 100c, 100d, are formed about the blade support body section.

The use of multiple beads assures that, when the blade support structure is tightened about the blade, spaced apart beads move into snug engagement with the blade bearing race. This relationship exists even where the blade support structure suffers from out-of-round or out-of-plane distortions created during manufacturing or as a result of improper blade.'support structure size adjustment.

In the knife illustrated by FIGS. 1-9 the blade support structure is initially formed with a continuous radially inwardly extending bead. The bead sections 100a-d are formed, by a machining operation that removes sections of the original bead, leaving a cylindrically curved surface spaced from the blade periphery.

The beads 100a, 100b extend from opposite sides of the split 33 and support the blade against gear induced reaction forces that urge the blade 20 away from the pinion gear 41 when the knife is operating. The blade race surface 70 thus tends to bear forcefully on the beads 100a, 100b in the vicinity of the pinion gear 41. The beads 100a, 100b are relatively longer than the beads 100c, 100d so that the gear reaction loads are distributed relatively widely. Although the gear reaction loads tend to force the blade 20 in a direction away from the pinion gear, the beads 100a, 100b prevent axial blade deflection and remain in bearing engagement with both race bearing surfaces 70, 72. This constrains the circumferential section of the blade 20 near the pinion gear against axial and radial shifting. In the blade support structure 16 illustrated by FIG. 8, the beads 100a, 100b subtend equal arcs of about around the axis 22.

The beads 100c, 100d are disposed diametrically opposite from the beads 100a, 100b and remote from the headpiece. See FIG. 8. The beads 100a-d bear firmly on the surfaces 70, 72 to maintain the blade 20 radially centered on the axis 22 and fixed against displacement in an axial direction. When the knife is being operated to slice teat or fat from a larger animal part the circumferential section of the blade in the vicinity of the beads 100c, 100d tends to be forced toward the radial blade support member wall 44. Engagement between the bearing face 72 and the beads 100c, 100d precludes axial blade deflection from forces exerted by slicing and trimming meat, etc. The radial component of deflection force is reacted against by the beads 100a, 100b to maintain the blade radially stabilized. The illustrated beads 100c, 100d subtend arcs of about 34° around the axis 22, respectively.

FIGS. 10-14 are illustrative of a modified knife that embodies the present invention. The knife of FIGS. 10-14 is constructed like the knife 10 except for the blade support structure 120 and blade 122. Accordingly, only the blade support structure 120 and blade 122 are illustrated and described in detail to the extent they differ from the blade support structure 16 and blade 20. Reference should be made to FIGS. 1-9 and the associated description for details of the remaining parts of the knife of FIGS. 10-14. Parts of the blade support structure 120 and blade 122 that are the same as parts of the blade support structure 16gand blade 20 are indicated by corresponding primed reference characters.

The blade support structure 120 supports the blade 122 for rotation about its central axis 124 with the blade and blade support structure engagable at least at spaced apart bearing locations proceeding in the direction of the axis 124. The axially spaced bearing locations suspend the blade so that the blade and blade housing remain spaced apart except for the bearing locations. See FIG. 14.

Figure 13:
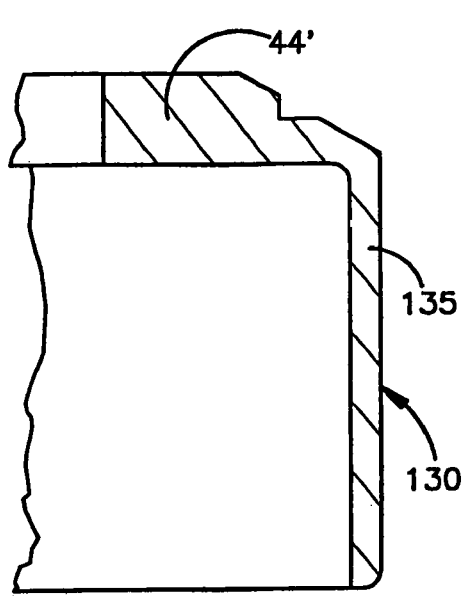
FIG. 13 is an enlarged cross sectional view of part of the blade support structure of FIG. 10 seen approximately from the plane indicated by the line 13-13.

The blade support structure 120 is constructed substantially like the blade support structure 16 except that its outer peripheral wall 130 defines a series of circumferentially spaced apart, radially thickened wall sections 132. The wall sections 132 define radially inwardly facing frustoconical bearing faces 133, 134 that are substantially centered on the axis 124 and converge proceeding in opposite axial directions. These bearing faces are engaged by bearing bead surfaces on the blade along narrow lines of contact. In the preferred embodiment the bearing faces 133, 134 form walls of inwardly opening grooves formed in each thickened wall section 132. The portions of the peripheral wall 130 between the thickened sections are relieved and spaced away from the blade bead surfaces at all times (FIG. 13).

The blade support structure 120 may be formed by machining a radially inwardly opening groove completely around the inner periphery of the peripheral wall 130 to define the bearing faces 133, 134. The thickened sections are then formed by machining the wall 130 to provide relieved, thin wall sections 135 between the sections 132 (see FIGS. 11-13).

The blade support structure illustrated in FIG. 11, et, eg. has four thickened sections. Two sections 132 extend oppositely from the split 33' in the blade support structure 120. The remaining two thickened sections are located on the diametrically opposite side of the blade support structure.

The bearing faces may be distributed about the axis 124 in any suitable pattern. Further, there may be more or fewer than four thickened sections.

The blade 122 is like the blade 20 except that the bearing race 66 of the blade 20 is replaced by a bearing bead 140 extending continuously about the blade periphery and projecting radially into contact with the bearing faces 133, 134. The bead 140 has a semicircular cross sectional shape so it defines bearing surfaces that converge proceeding toward each other and contacts the support housing bearing faces 133, 134 along lines of bearing contact 102', 104' that extend the length of the grooves.

The bearing contact line segments assure that the blade and blade support structure engage only along extremely small contact areas. The axially spaced apart bearing contact line segments assure that the blade is positively supported against radial and axial vibrations relative to the blade support structure while frictional resistance to blade rotation afforded by the bearing contact is minimized.

Figure 14:
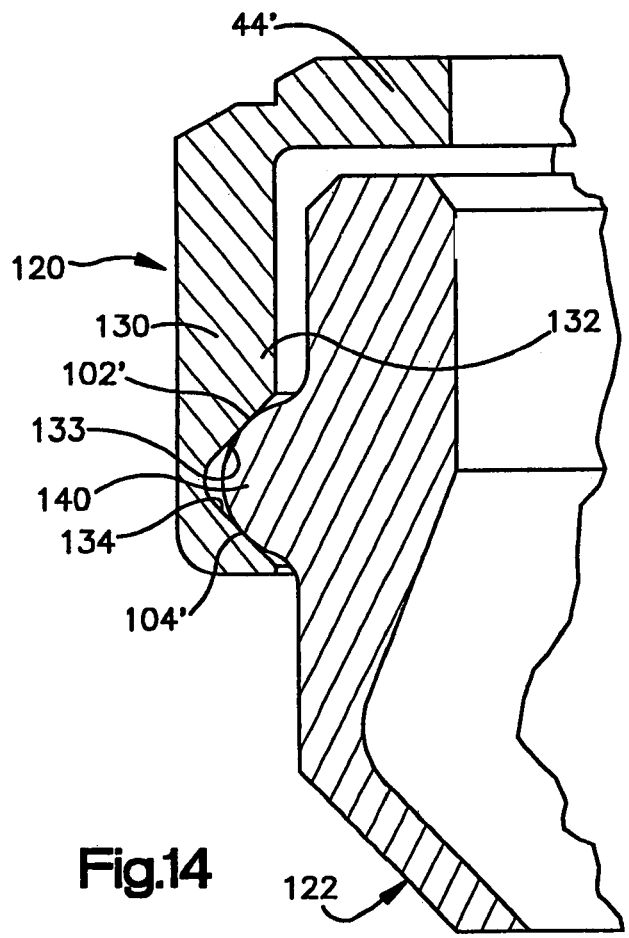
FIG. 14 is an enlarged fragmentary cross sectional view, similar to FIG. 9, of the modified knife with the blade assembled to the blade support

The blade support structure 120 is tightened about the blade with the bearing faces 133, 134 contacting the bead 140 and suspending the blade so it does not make contact with the blade supporting structure except at the lines of bearing contact (FIG. 14). When positioned as desired, the blade support structure 120 is fixed in position by clamping screws like the screws 36.

Figure 15:
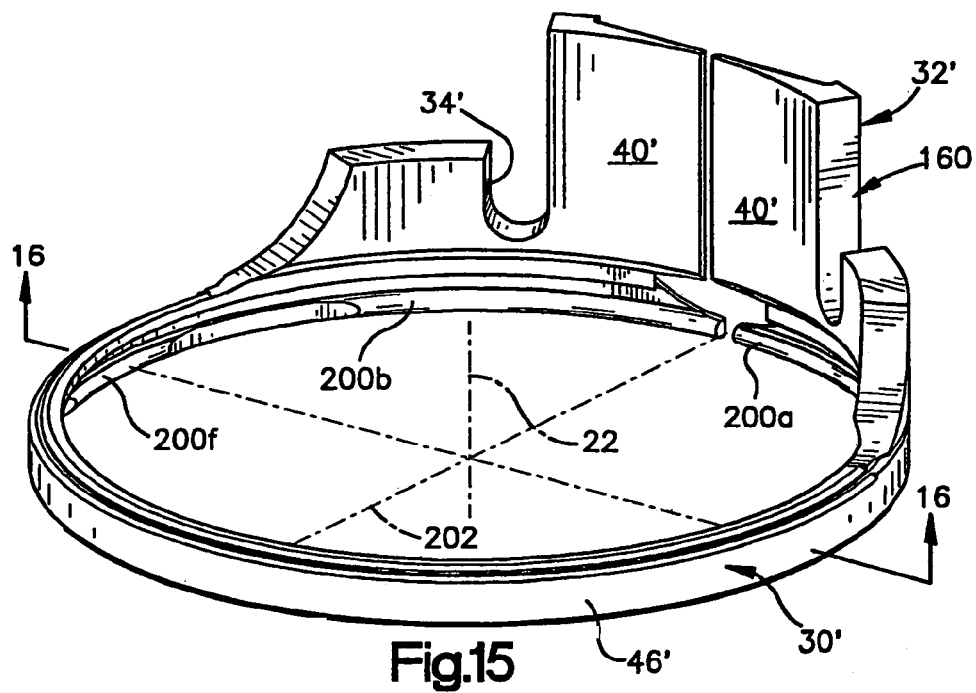
FIG. 15 is a perspective view of part of another modified knife embodying the invention; and, FIG. 16 is a cross sectional view seen approximately from the plane indicated by the line 16-16 of FIG. 15.
Figure 16:
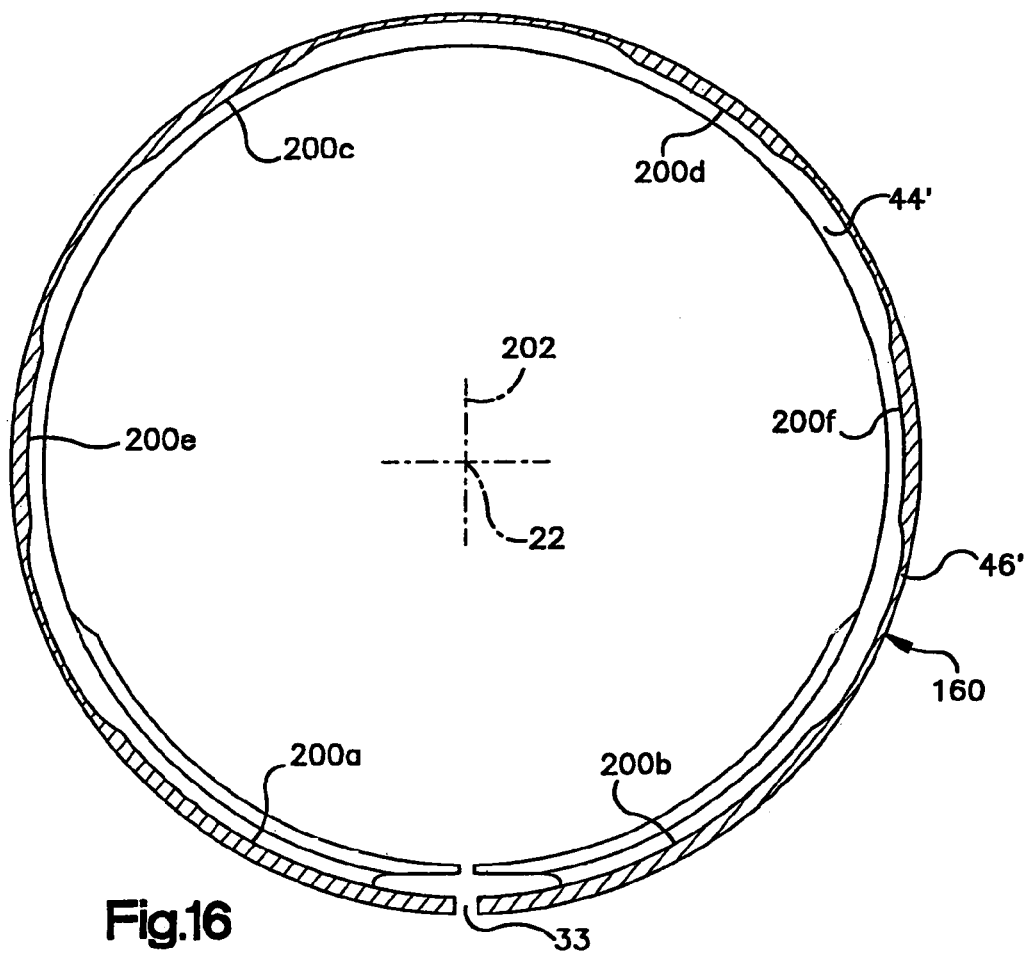

FIGS. 15 and 16 illustrate still another knife construction that is the same as the knife 10 of FIGS. 1-9 except for the blade support structure 160. The blade support structure 160 is constructed the same as the-blade support structure 16 except-that six bearing bead sections 200a, 200b, 200c, 200d, 200e, and 200f are provided to establish bearing contact with the blade, rather than the four bearing beads provided by the blade support structure 16. The blade used with the blade support 160 is identical to the blade 20 and is therefore not illustrated. Parts of the blade support structure 160 that are identical to parts of the blade support structure 16 are indicated by corresponding reference characters and are not described further.

The bearing bead sections 200a, 200b extend from opposite sides of the split 33 and support the blade against gear, induced reaction forces that urge the blade 20 away from the pinion gear 41 when the knife is operating. The beads 200a, 200b occupy the same arc lengths as the beads 100a, 100b and are relatively longer than the beads 200c, 200f so that the gear reaction loads are distributed relatively widely. Although the reaction loads tend to force the blade 20 in a direction away from the pinion gear, the beads 200a, 200b prevent axial blade deflection and remain in bearing engagement with both blade race bearing surfaces 70, 72. The circumferential section of the blade 20 near the pinion-gear is constrained against axial and radial shifting by the bead and race engagement. In the blade support 160 illustrated by FIGS. 15 and 16, the beads 200a, 200b subtend equal arcs of about 58° around the axis 22.

The beads 200c, 200d are disposed diametrically opposite from the beads 200a, 200b and remote from the knife headpiece. The beads 200c, 200d are identical to the beads of the knife of FIGS. 1-9 and are spaced apart the same arc length i.e. each subtends an arc of about 34° around the axis 22 and the beads are spaced about 34° apart. The bead 200e is centered between the beads 200a, 200c while the bead 200f is centered between the beads 200b, 200d See FIG. 15. The beads 200e, 200f subtend arcs of about 350° respectively. The beads 200c-f bear firmly on the blade bearing race surfaces 70, 72 to maintain the blade 20 radially centered on the axis 22 and fixed against axial displacement.

The beads 200a-f coact with the bearing faces 70, 72 and with each other to preclude both axial and radial blade vibrations. Any tendency for one circumferential portion of the blade 20 to deflect axially creates an axial and a radial component of reaction force applied to the blade by the bead engaging the affected circumferential blade portion. The radially directed force, which might otherwise shift the blade radially away from the bead, is reacted against by one or more beads located on the diametrically opposed side of the blade'so that no radial blade motion occurs. This obviates blade vibrations.

Knives equipped with the blade support structure 160 may exhibit a longer effective blade life than those equipped with the blade support structure 16. When the beads 100a-100d wear as a result of extensive use, the blade 20 might be able to contact the blade support body section 30 in the space between the beads 1000a and 100c, or between the beads 100b and 100d during use. This would cause blade wear and necessitate eventual replacement. When knives equipped with the blade support structure 60 experience the same amount of wear on the beads 200a-d, the bead 200e or the bead 200f preludes the blade from contacting the body section 30, thus avoiding blade wear. The amount of heat generated by the blade support structure 160 has not been observed to be greater than that generated by the blade support structure 16.

The beads 100 and 200 that are illustrated in connection with FIGS. 1-9 and FIGS. 15 and 16, respectively, are located symmetrically about a line 202 extending through the split 33 and the diametrically opposite side of the blade support body section 30. It should be appreciated that the beads 100a-d or the beads 200a-f could be distributed in different configurations about the body section 30, and have different arc lengths from those noted above, depending on what use the knife 10 is to be put. Furthermore, three beads, five beads or mote than six beads, might be employed depending on knife usage.

In theory, even a single bead, extending substantially about the blade 20, could be employed in the knife 10 so long as the blade 20 was supported substantially about its periphery, at axially spaced bearing locations. In practice, such a construction is problematical because the blade support structure would have to be radially expansible to permit blade removal and replacement. Adjusting the blade support structure diameter so that the blade is uniformly and firmly engaged by a single bead about its periphery is difficult. The blade tends to be engaged at one or two random locations resulting in radial and axial blade vibration. Furthermore, where the blade is snugly engaged by the support structure substantially about its periphery, blade heating during use is greater than experienced with multiple bearing beads because the single bead contacts the bearing surfaces 70, 72 over longer lengths.

While different embodiments of the invention have been illustrated and described, the invention is not to be considered limited to the precise constructions shown. Various modifications, adaptations, and uses of the invention may occur to those having ordinary skill in the business of constructing power operated rotary knives. The intention is to cover hereby all such modifications, adaptations and uses that fall within the scope or spirit of the appended claims.

Having described my invention I claim:

1. A rotary knife blade comprising:
    a rotatable annular body defining first and second axial ends, said body disposed about a central axis; and,
    an annular blade section rotatable with the annular body and projecting axially from the first axial end of said body;
    said rotatable annular body comprised of a wall defining a radially outer surface disposed between said first and second axial ends, and an annular bearing race in said surface and extending radially into said wall, said bearing race spaced axially from said blade section and comprising a first surface that converges proceeding away from said second axial end, and a second surface that converges proceeding toward said first surface, said first and second surfaces defining first and second bearing faces spaced axially apart.

2. The rotary knife blade of 1 wherein the bearing race is adapted to engage a blade housing bearing structure, the bearing race including a third surface extending between adjacent ends of the first and second bearing surfaces, the first and second bearing faces engaging the blade housing bearing structure and the third surface spaced from the blade housing bearing structure.

3. The rotary knife blade of claim 1 wherein said second surface converges proceeding away from said first axial end.

4. A rotary knife blade comprising:
    a rotatable annular body defining first and second axial ends, the annular body disposed about a central axis;
    an annular blade section rotatable with the annular body and projecting axially from the first axial end of the annular body; and
    wherein said annular body comprises a wall defining a radially outer surface disposed between the first and second axial ends, and a groove in the outer surface extending radially into said wall, the groove spaced axially from said blade section and comprising a first bearing surface and a second bearing surface spaced axially apart from the first bearing surface, the first and second bearing surfaces converging proceeding toward each other.

5. The rotary knife blade of claim 4 wherein the groove is adapted to engage a blade housing bearing structure, the groove including a third surface extending between adjacent ends of the first and second bearing surfaces, the first and second bearing faces engaging the blade housing bearing structure and the third surface spaced from the blade housing bearing structure.

6. The rotary knife blade of claim 4 wherein said first bearing surface converges proceeding away from said second axial end and said second surface converges proceeding away from said first axial end.

7. A rotary knife blade adapted to be rotably supported in a blade housing and engage a bearing structure of the blade housing, the rotary knife blade comprising:
    a rotatable annular body defining first and second axial ends, said body disposed about a central axis; and,
    an annular blade section rotatable with the annular body and projecting axially from the first axial end of said body;
    said rotatable annular body comprised of a wall defining a radially outer surface disposed between said first and second axial ends, and an annular bearing race in said surface and extending radially into said wall, said bearing race spaced axially from said blade section and comprising a first surface that converges proceeding away from said second axial end, and a second surface that converges proceeding toward said first surface, said first and second surfaces defining first and second bearing faces spaced axially apart for engaging the blade housing bearing structure wherein inner ends of the first and second surfaces are spaced from the blade housing bearing structure.

8. The rotary knife blade of claim 7 wherein said second surface converges proceeding away from said first axial end.

9. A rotary knife blade adapted to be rotably supported in a blade housing and engage a bearing structure of the blade housing, the rotary knife blade comprising:
    a rotatable annular body defining first and second axial ends, said body disposed about a central axis; and,
    an annular blade section rotatable with the annular body and projecting axially from the first axial end of said body;
    said rotatable annular body comprised of a wall defining a radially outer surface disposed between said first and second axial ends, the radially outer surface including a bearing structure for engaging the blade housing bearing structure, said annular body bearing structure spaced axially from said blade section and comprising a first bearing surface and a second bearing surface spaced axially apart from the first bearing surface for engaging the blade housing bearing structure wherein the first bearing surface converges proceeding toward the second bearing surface and the second bearing surface converges proceeding toward the first bearing surface and further wherein inner ends of the first and second bearing surfaces are spaced from the blade housing bearing structure.

10. The rotary knife blade of claim 9 wherein said first bearing surface converges proceeding away from said second axial end and said second surface converges proceeding away from said first axial end.

* * * * *